United States Patent
Kucik

(10) Patent No.: US 6,380,888 B1
(45) Date of Patent: Apr. 30, 2002

(54) SELF-CONTAINED, SELF-SURVEYING DIFFERENTIAL GPS BASE STATION AND METHOD OF OPERATING SAME

(75) Inventor: Daniel P. Kucik, Lynn Haven, FL (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 0 days.

(21) Appl. No.: 09/710,742

(22) Filed: Nov. 13, 2000

(51) Int. Cl.[7] .............................. G01S 5/02; H04B 7/185
(52) U.S. Cl. .................... 342/357.03; 701/215
(58) Field of Search ...................... 342/357.03; 701/215

(56) References Cited

U.S. PATENT DOCUMENTS 5,884,220 A * 3/1999 Farmer et al. .............. 701/215

* cited by examiner

*Primary Examiner*—Theodore M. Blum
(74) *Attorney, Agent, or Firm*—Donald G. Peck; Harvey A. Gilbert

(57) ABSTRACT

A self-contained, self-surveying differential GPS base station system and method of operating same are provided. The system and method use a conventional differential GPS base station. The base station's National Marine Electronics Association (NMEA) data sentences identify a determined position of the base station and fix quality information associated with the determined position. The system and method automatically identify the determined position as an acceptable position when the fix quality information associated with the determined position satisfies a selected criteria which is stored on-site. The system and method then automatically average together each acceptable position to generate an updated position. The updated position is automatically supplied to the base station at a prescribed time for use by the base station in generating Radio Technical Commission for Maritime Services (RTCM) differential corrections for transmission over the air waves.

22 Claims, 2 Drawing Sheets

SELF-CONTAINED, SELF-SURVEYING DIFFERENTIAL GPS BASE STATION AND METHOD OF OPERATING SAME

ORIGIN OF THE INVENTION

The invention described herein was made in the performance of official duties by an employee of the Department of the Navy and may be manufactured, used, licensed by or for the Government for any governmental purpose without payment of any royalties thereon.

1. Field of the Invention

The invention relates generally to use of the Global Positioning System (GPS) to generate local position data, and more particularly to a self-contained, self-surveying differential GPS base station and method of operating same that automatically surveys the base station's local position without any operator intervention.

2. Background of the Invention

Satellite-based global positioning systems such as the U.S.-based Global Positioning System (GPS) and the former Soviet Union's GLONASS system are well known in the art. While these systems were initially developed for military applications, their use in a variety of civilian applications has steadily increased. For years, the U.S.-based GPS provided a higher degree of positional accuracy for military applications than for civilian applications owing to a deliberately-induced error factor known as "selective availability".

Since the deactivation of "selective availability" on May 2, 2000, a standard off-the-shelf GPS receiver currently provides position information with an error of approximately 10 meters. A significant improvement in accuracy can be obtained through the use of differential corrections generated by a differential GPS (or DGPS) base station. Depending on the hardware, errors of less than 1 foot can be achieved. However, these highly accurate results can only be achieved if the base station is in close proximity to the operating area of rover DGPS receivers. Typically, the use of a publicly-available base station (e.g., a U.S. Coast Guard base station) does not produce highly accurate results because there is usually a large distance between the rover DGPS receivers and a U.S. Coast Guard base station. Accordingly, it is extremely beneficial to have a "local" differential base station that is closer to rover receivers than one of the fixed-position, publicly-available base stations.

A differential base station operates by taking the known position of its GPS antenna and, in essence, reverse calculates what it should expect to see from the satellites. As the base station receives the satellite data, it compares the expected and the actual data received to compute corrections for each satellite in view. The computed corrections are then sent to rover DGPS units, which apply the corrections to their own position calculations to remove errors resulting from atmospheric conditions and timing errors with the satellites.

The setting up of a base station requires that the position of its GPS antenna be surveyed in order to enable the above described correction calculations. The base station's GPS antenna must be surveyed with a high degree of accuracy to enable rover DGPS receivers to provide highly accurate absolute position information. Typically, the setting up of a base station consists of having a survey crew determine the latitude, longitude, and altitude of the station's GPS antenna. Such manual surveying techniques require time, money and additional equipment. An alternative approach is to attach a PC to the base station and have it average the position information being returned by the station. The user must then take the calculated position from the PC and update the base station's setup parameters. This method requires that a man be present on site for some period of time. Thus, neither of these methods can be done in stride or in a "drop-and-go" fashion.

SUMMARY OF THE INVENTION

Accordingly, it is an object of the present invention to provide a self-contained, self-surveying differential GPS base station and method of operating same that will produce accurate position information for rover DGPS receivers simply by turning on the base station.

Another object of the present invention to provide a self-contained, self-surveying differential GPS base station for use in areas that cannot be surveyed by conventional means.

Still another object of the present invention to provide a method of operating a differential GPS base station.

Other objects and advantages of the present invention will become more obvious hereinafter in the specification and drawings.

In accordance with the present invention, a self-contained, self-surveying differential GPS base station system and method of operating same are provided. The system and method use a differential GPS base station capable of generating National Marine Electronics Association (NMEA) data sentences and capable of generating Radio Technical Commission for Maritime Services (RTCM) differential corrections for transmission over the air waves. Each NMEA data sentence identifies a determined position of the base station and fix quality information associated with the determined position. The system and method automatically identify the determined position as an acceptable position when the fix quality information associated with the determined position satisfies a selected criteria which is stored on-site. The system and method then automatically average together each acceptable position to generate an updated position. The updated position is automatically supplied to the base station at a prescribed time for use by the base station in generating the RTCM differential corrections.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Figure 1:
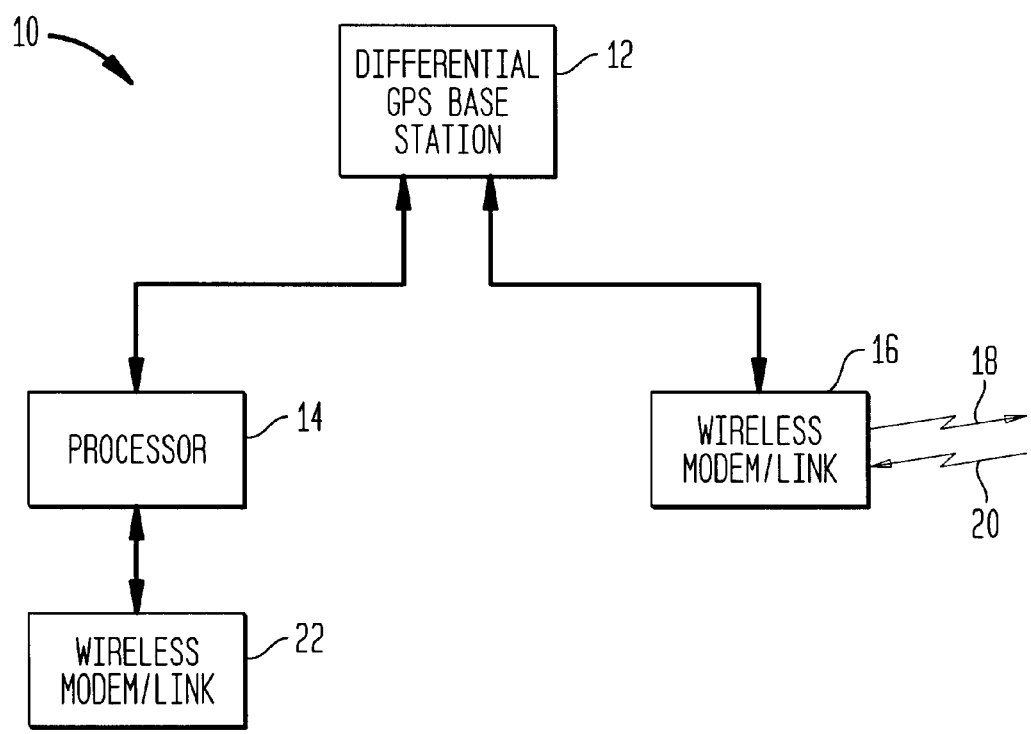
FIG. 1 is a block diagram of a self-contained, self-surveying differential GPS base station system according to an embodiment of the present invention.

Referring now to the drawings, and more particularly to FIG. 1, a block diagram of a self-contained, self-surveying differential GPS (DGPS) base station system according to an embodiment of the present invention is shown and referenced generally by numeral 10. System 10 is depicted with its functional elements and the data flow therebetween.

System 10 can be deployed in an area that has not been surveyed, and then automatically survey its own position and broadcast RTCM differential corrections over the air waves for use by one or more rover DGPS receivers (not shown) in the vicinity thereof.

System 10 includes a conventional differential GPS base station 12, a variety of which are commercially available from manufacturers such as Ashtech Incorporated, a division of Magellan Corporation, Santa Clara, Calif., and Trimble Navigation Limited, Sunnyvale, Calif. Base station 12 is equipped with the capability of outputting National Marine Electronics Association (NMEA) data sentences, and generating Radio Technical Commission for Maritime Services (RTCM) differential corrections to be broadcast over the air waves 20 for use by the rover DGPS receiver(s). NMEA data sentences, as they are known, refer to the NMEA's 0183 specification that defines the standards for interfacing marine electronic devices. The GPS related data conveyed using this standard includes the position of the GPS receiver and fix quality information (values) that indicate the accuracy of the position fix. RTCM differential corrections refer to the RTCM's SC-104 data format specification that defines the standard for DGPS services. This data format is used in the transmission of satellite correction information from a base station to rover receivers.

When base station 12 is operating in its normal manner, NMEA data sentences will be provided to a processor 14 having onboard memory storage coupled to base station 12, while RTCM differential corrections will be sent to a wireless modem/link 16 for transmission over the air waves as indicated at 18. Note that processor 14 can be an off-the-shelf microcontroller programmed to carry out the method of the present invention. However, the functionality of processor 14 could also be implemented in the firmware of base station 12. Another option in the present invention is to utilize modem/link 16 to receive RTCM differential corrections 20 from another base station (not shown) to further enhance the surveying process. A still further option is to provide a second wireless modem/link 22 that can receive changes to the programming implemented by processor 14 from a remote location. Modem/link 22 could also be used to transmit, for example, status data related to processor 14 over the air waves.

Figure 2:
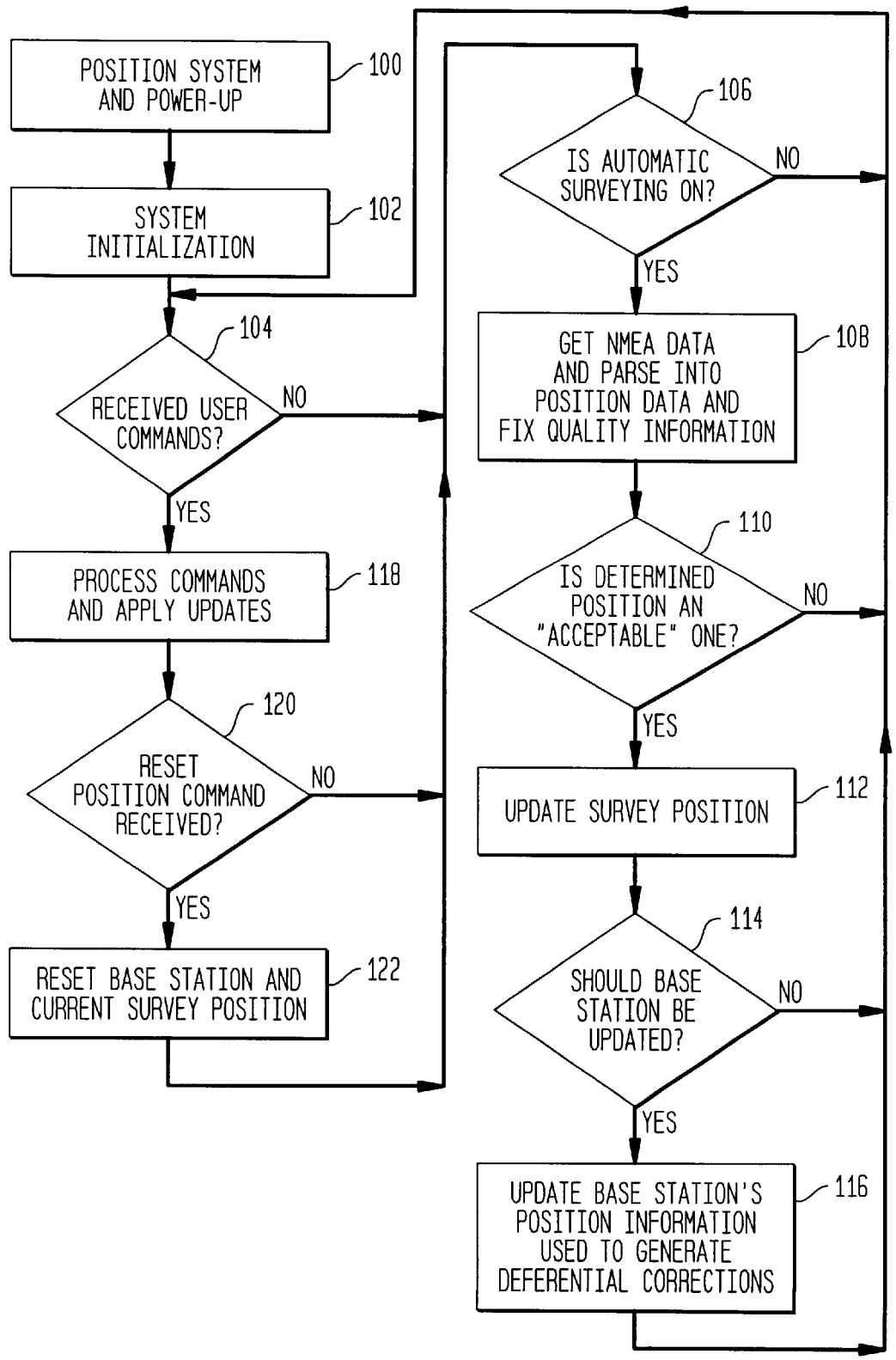
FIG. 2 is a flow chart of the method of operating the system of the present invention.

One method of operating system 10 according to the present invention will now be explained with the aid of the flow chart in FIG. 2. At step 100, system 10 is positioned and powered up. That is, each element of system 10 requiring power receives same from an onboard power supply (not shown). Once powered up, base station 12 and processor 14 are automatically initialized at step 102 to a default start-up state in which the system's survey position maintained by processor 14 is reset to an initial condition (e.g., zero) as will be explained further below. Furthermore, step 102 initializes base station 12 to a state in which no RTCM differential corrections 18 are transmitted. More specifically, the transmission of RTCM differential corrections is prevented until base station 12 has received its first survey position update from processor 14 in step 116 as will be explained further below. This prevents the transmission of premature/invalid RTCM differential corrections.

As mentioned above, it is possible to remotely change some of the programming of processor 14 via modem/link 22. Accordingly, a check is made at step 104 to see if any user commands were received by modem/link 22. At this point in the description, it will be assumed that there were no user commands received or that there is no modem/link 22 to receive such commands, i.e., the programming of processor 14 is fixed, and that the present invention is ready to begin the automatic surveying process. A description related to the receipt of such user commands will be provided below.

The automatic surveying process can begin at step 106 is with a check to see if such surveying is requested. This is typically accomplished by means of a software flag within processor 14 that is turned on (i.e., proceed to step 108) or turned off (i.e., loop back to step 104) by the operation of the software. For example, it may be desirable to delay the start of the automatic surveying for a given period of time after power-up step 100. The time delay could be selected/designed to compensate for the turning on of system 10 prior to the stationary positioning thereof. Another option would be to turn off the automatic surveying after a selected period of time or after a fixed number of base station position updates (i.e., a fixed number of executions of step 116 explained further below). This effectively fixes the position value(s) used to generate RTCM differential corrections 18. This feature is useful in the field of relative navigation where the relative positioning between DGPS rover receivers (using corrections 18 from system 10) is more important than the absolute location of the DGPS rover receivers.

Assuming automatic surveying is requested, the present invention continues with step 108 where NMEA data sentences are retrieved from base station 12. The retrieved NMEA data sentences are parsed into data indicating a position determined by base station 12 using the GPS satellites (not shown) and fix quality information associated with the deter mined position. Typical fix quality information includes: the number of GPS satellites used to generate the associated position; dilution of precision values indicating the possibility of errors resulting from the position of the GPS satellites relative to one another; the signal-to-noise ratio indicating the strength of the signals from the GPS satellites detected by the receiver; a GPS quality indicator indicating whether the associated position was determined using GPS or DGPS processing; etc.

At step 110, the process evaluates the fix quality information associated with a base station-determined position relative to a set of selected criteria for the fix quality information. That is, step 110 identifies a position determined by base station 12 as an "acceptable position" when the determined position's fix quality information satisfies the set of selected criteria. The selected criteria is stored at processor 14 and may be changed from a remote location as described further below.

The selected criteria could simply specify the number of GPS satellites that must be used for a determined position to be an acceptable position. The selected criteria might also include, or alternatively be based on, a threshold signal-to-noise ratio which would indicate the existence of a multipath problem. Thus, it is to be understood that the selected criteria could include threshold levels for any or all of the fix quality information associated with the position determined by base station 12. If the selected criteria is satisfied, the surveyed position of system 10 stored in processor 14 is updated at step 112. If the selected criteria is not satisfied, the determined position is discarded and the process loops back to step 104.

Assuming the selected criteria for evaluating the fix quality information is satisfied, the survey position of system 10 stored in processor 14 is updated at step 112. For the first pass of the self-surveying process, the current survey position is zero as set by system initialization step 102. Step 112 is essentially an averaging process where each acceptable position identified by step 110 is averaged with the current survey position. The type of averaging could be a straight or non-weighted average, or could be a weighted average. In terms of a weighted average, each acceptable position could contribute proportionally to the weighted average based upon how well the fix quality information satisfies the selected criteria. For example, if the selected criteria used to evaluate the fix quality information required four GPS satellites for an acceptable position, a determined position based on five satellites would be weighted more heavily than one based on four satellites.

After each survey position update step 112, the method continues at step 114 to determine if the updated survey position should be sent to base station 12 for use in generating its RTCM differential corrections. The criteria used at step 114 can be a user-selected number of survey updates, a time period after power-up step 100, etc., or some combination thereof. If it is not yet time for the updated survey position to be used by base station 12, the process loops back to step 104. Assuming that the criteria at step 114 is satisfied, the updated survey position is forwarded to base station 12 at step 116 for use in generating its RTCM differential corrections and for the transmission thereof as indicated by reference numeral 18. (The process for generating an RTCM differential correction from position data is well understood in the art and need not be explained further herein.) At the conclusion of step 116, the process loops back to step 104.

If the present invention is equipped with modem/link 22, user commands or updates can be made available at step 104. Such updates could include changes to the selected criteria used to evaluate the fix quality information at step 110. Changes could also be made to the criteria used at step 114 to determine when an updated survey position is supplied to base station 12. Accordingly, the presence of any such user commands or updates will trigger step 118 where the changes 70 are applied prior to commencement of the automatic surveying process.

One of the possible commands that the present invention can be equipped to handle is a system reset command that places system 10 back to its system initialization conditions without turning the power off. Such would be the case if the automatic surveying process was to be started anew, if system 10 were moved to a new location, etc. Accordingly, the method of the present invention would typically check for the presence of a reset command at step 120 and then reset the current survey position to zero and re-initialize base station 12 at step 122 to prevent the transmission of RTCM differential corrections 18 as described above.

The advantages of the present invention are numerous. The self-contained, self-surveying differential GPS base station system will be of great utility in areas that cannot be surveyed by conventional means. The system and method of operating same allows for quick "drop and go" operation and requires no user intervention after power up. While the accuracy of the position fixes generated by rover DGPS receivers incorporating the RTCM corrections generated by the present invention will depend on the length of time the invention is allowed to self-survey, the rover receivers will always generate accurate relative position fixes.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A self-contained, self-surveying differential GPS base station system, comprising:
   a differential GPS base station capable of generating National Marine Electronics Association (NMEA) data sentences, each of said data sentences identifying a determined position of said base station and fix quality information associated with said determined position, said base station further being capable of generating Radio Technical Commission for Maritime Services (RTCM) differential corrections for transmission over the air waves;
   means for automatically identifying said determined position as an acceptable position when said fix quality information associated with said determined position satisfies a selected criteria;
   means for storing said selected criteria;
   means for automatically averaging together each said acceptable position to generate an updated position; and
   means for automatically supplying said base station with said updated position for use in generating said RTCM differential corrections.

2. A self-contained, self-surveying differential GPS base station system as in claim 1 further comprising means, coupled to said base station, for receiving remotely-generated RTCM differential corrections over the air waves from a remote location.

3. A self-contained, self-surveying differential GPS base station system as in claim 2 wherein said means for receiving said remotely-generated RTCM differential corrections is a wireless modem.

4. A self-contained, self-surveying differential GPS base station system as in claim 1 further comprising means, coupled to said means for storing, for receiving said selected criteria over the air waves from a remote location.

5. A self-contained, self-surveying differential GPS base station system as in claim 4 wherein said means for receiving said selected criteria is a wireless modem.

6. A self-contained, self-surveying differential GPS base station system as in claim 1, wherein said means for averaging comprises means for generating a straight average as said updated position using each said acceptable position.

7. A self-contained, self-surveying differential GPS base station system as in claim 1, wherein said means for averaging comprises means for generating a weighted average as said updated position wherein each said acceptable position contributes proportionally to said weighted average based on said fix quality information associated therewith.

8. A method of operating a differential GPS base station, comprising the steps of:
   providing a differential GPS base station capable of generating National Marine Electronics Association (NMEA) data sentences, each of said data sentences identifying a determined position of said base station and fix quality information associated with said determined position, said base station further being capable of generating Radio Technical Commission for Maritime Services (RTCM) differential corrections for transmission over the air waves;
   automatically identifying said determined position as an acceptable position when said fix quality information associated with said determined position satisfies a selected criteria;
   automatically averaging together each said acceptable position to generate an updated position; and automatically supplying said base station with said updated position for use in generating said RTCM differential corrections.

9. A method according to claim 8 further comprising the step of resetting said updated position to an initial condition whenever said base station is moved or turned on.

10. A method according to claim 8 further comprising the step of limiting said step of automatically averaging to a specific number of occurrences.

11. A method according to claim 10 further comprising the step of changing said specific number of occurrences over the air waves from a location that is remote with respect to said base station.

12. A method according to claim 8 further comprising the step of repeating said step of automatically averaging a specific number of times prior to said step of automatically supplying.

13. A method according to claim 12 further comprising the step of changing said specific number of times over the air waves from a location that is remote with respect to said base station.

14. A method according to claim 8 further comprising the step of changing said selected criteria over the air waves from a location that is remote with respect to said base station.

15. A method according to claim 8 wherein said step of automatically averaging comprises the step of generating a straight average as said updated position using each said acceptable position.

16. A method according to claim 8 wherein said step of automatically averaging comprises the step of generating a weighted average as said updated position wherein each said acceptable position contributes proportionally to said weighted average based on said fix quality information associated therewith.

17. A method of operating a differential GPS base station, comprising the steps of:
   providing a differential GPS base station capable of generating National Marine Electronics Association (NMEA) data sentences, each of said data sentences identifying a determined position of said base station and fix quality information associated with said determined position, said base station further being capable of generating Radio Technical Commission for Maritime Services (RTCM) differential corrections for transmission over the air waves;
   storing selected criteria for evaluating said fix quality information;
   automatically identifying said determined position as an acceptable position when said fix quality information associated with said determined position satisfies said selected criteria;
   automatically averaging together each said acceptable position to generate an updated position;
   repeating said step of automatically averaging a specific number of times; and
   automatically supplying said base station with said updated position at the conclusion of said step of repeating for use in generating said RTCM differential corrections.

18. A method according to claim 17 further comprising the step of resetting said updated position to an initial condition whenever said base station is moved or turned on.

19. A method according to claim 17 further comprising the step of changing said specific number of times over the air waves from a location that is remote with respect to said base station.

20. A method according to claim 17 further comprising the step of changing said selected criteria over the air waves from a location that is remote with respect to said base station.

21. A method according to claim 17 wherein said step of automatically averaging comprises the step of generating a straight average as said updated position using each said acceptable position.

22. A method according to claim 17 wherein said step of automatically averaging comprises the step of generating a weighted average as said updated position wherein each said acceptable position contributes proportionally to said weighted average based on said fix quality information associated therewith.

* * * * *